US012236960B2

(12) United States Patent
Neusinger et al.

(10) Patent No.: US 12,236,960 B2
(45) **Date of Patent: *Feb. 25, 2025**

(54) APPARATUS, METHOD AND COMPUTER PROGRAM FOR UPMIXING A DOWNMIX AUDIO SIGNAL USING A PHASE VALUE SMOOTHING

(71) Applicant: Fraunhofer-Gesellschaft zur Foerderung der angewandten Forschung e.V., Munich (DE)

(72) Inventors: Matthias Neusinger, Rohr (DE); Julien Robilliard, Nuremberg (DE); Johannes Hilpert, Nuremberg (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,881

(22) Filed: Jul. 20, 2022

(65) Prior Publication Data

US 2022/0358939 A1 Nov. 10, 2022

Related U.S. Application Data

(63) Continuation of application No. 16/776,621, filed on Jan. 30, 2020, now Pat. No. 11,430,453, which is a (Continued)

(51) Int. Cl.
*G10L 19/008* (2013.01)

(52) U.S. Cl.
CPC ........ *G10L 19/008* (2013.01); *H04S 2420/03* (2013.01)

(58) Field of Classification Search
CPC ........................... G10L 19/008; H04S 2420/03
(Continued)

(56) References Cited

U.S. PATENT DOCUMENTS 6,737,572 B1 * 5/2004 Jameson ................ G10H 3/125 84/743
7,222,070 B1 * 5/2007 Stachurski ............. G10L 19/04 704/207

(Continued)

OTHER PUBLICATIONS

Neusinger et al., "Apparatus, Method and Computer Program for Upmixing a Downmix Audio Signal Using a Phase Value Smoothing", U.S. Appl. No. 16/776,621, filed Jan. 30, 2020.

*Primary Examiner* — William A Jerez Lora
(74) *Attorney, Agent, or Firm* — Keating & Bennett, LLP

(57) ABSTRACT

An apparatus for upmixing a downmix audio signal describing one or more downmix audio channels into an upmixed audio signal describing a plurality of upmixed audio channels includes an upmixer and a parameter determinator. The upmixer is configured to apply temporally variable upmix parameters to upmix the downmix audio signal in order to obtain the upmixed audio signal, wherein the temporally variable upmix parameters include temporally variable smoothened phase values. The parameter determinator is configured to obtain one or more temporally smoothened upmix parameters for usage by the upmixer on the basis of a quantized upmix parameter input information. The parameter determinator is configured to combine a scaled version of a previous smoothened phase value with a scaled version of an input phase information using a phase change limitation algorithm, to determine a current smoothened phase value on the basis of the previous smoothened phase value and the phase input information.

12 Claims, 8 Drawing Sheets

Related U.S. Application Data continuation of application No. 16/104,990, filed on Aug. 20, 2018, now Pat. No. 10,580,418, which is a continuation of application No. 15/636,808, filed on Jun. 29, 2017, now Pat. No. 10,056,087, which is a continuation of application No. 14/600,122, filed on Jan. 20, 2015, now Pat. No. 9,734,832, which is a continuation of application No. 13/151,412, filed on Jun. 2, 2011, now Pat. No. 9,053,700, which is a continuation of application No. PCT/EP2010/054448, filed on Apr. 1, 2010.

(60) Provisional application No. 61/167,607, filed on Apr. 8, 2009.

(58) Field of Classification Search
USPC .............................. 381/1, 2, 17, 19–23, 300
See application file for complete search history.

(56) References Cited

U.S. PATENT DOCUMENTS

| | | | | |
|---|---|---|---|---|
| 2006/0153408 | A1* | 7/2006 | Faller | G10L 19/008 381/307 |
| 2008/0031463 | A1* | 2/2008 | Davis | G10L 19/02 381/17 |
| 2010/0286990 | A1* | 11/2010 | Biswas | G10L 19/26 704/502 |

* cited by examiner

| FIG 2A | FIG 2B |
|---|---|

$$(\alpha_n - \tilde{\alpha}_{n-1}) < -\pi$$

$$\delta\alpha_n + (1-\delta)\tilde{\alpha}_{n-1} < (1-\delta)2\pi$$

$$(\alpha_n - \tilde{\alpha}_{n-1}) < -\pi$$

$$\delta\alpha_n + (1-\delta)\tilde{\alpha}_{n-1} > (1-\delta)2\pi$$

(modulo case)

APPARATUS, METHOD AND COMPUTER PROGRAM FOR UPMIXING A DOWNMIX AUDIO SIGNAL USING A PHASE VALUE SMOOTHING

CROSS-REFERENCE TO RELATED APPLICATIONS

This application is a continuation of U.S. patent application Ser. No. 16/776,621, filed Jan. 30, 2020, which is incorporated herein by reference in its entirety, which in turn is a continuation of U.S. patent application Ser. No. 16/104,990, filed Aug. 20, 2018, which in turn is a continuation of U.S. application Ser. No. 15/636,808, filed Jun. 29, 2017, which in turn is a continuation of U.S. patent application Ser. No. 14/600,122, filed Jan. 20, 2015, which in turn is a continuation of U.S. patent application Ser. No. 13/151,412, filed Jun. 2, 2011, all of which are incorporated herein by reference in their entirety, which is a continuation of copending International Application No. PCT/EP2010/054448, filed Apr. 1, 2010, which is incorporated herein by reference in its entirety, and additionally claims priority from U.S. Application No. 61/167,607 filed Apr. 8, 2009, which is incorporated herein by reference in its entirety.

BACKGROUND OF THE INVENTION

Embodiments according to the invention are related to an apparatus, a method, and a computer program for upmixing a downmix audio signal.

Some embodiments according to the invention are related to an adaptive phase parameter smoothing for parametric multi-channel audio coding.

In the following, the context of the invention will be described. Recent development in the area of parametric audio coding delivers techniques for jointly coding a multi-channel audio (e.g. 5.1) signal into one (or more) downmix channels plus a side information stream. These techniques are known as Binaural Cue Coding, Parametric Stereo, and MPEG Surround etc.

A number of publications describe the so-called "Binaural Cue Coding" parametric multi-channel coding approach, see for example references [1][2][3][4][5].

"Parametric Stereo" is a related technique for the parametric coding of a two-channel stereo signal based on a transmitted mono signal plus parameter side information, see, for example, references [6][7].

"MPEG Surround" is an ISO standard for parametric multi-channel coding, see, for example, reference [8].

The above-mentioned techniques are based on transmitting the relevant perceptual cues for a human's spatial hearing in a compact form to the receiver together with the associated mono or stereo downmix-signal. Typical cues can be inter-channel level differences (ILD), inter-channel correlation or coherence (ICC), as well as inter-channel time differences (ITD), inter-channel phase differences (IPD), and overall phase differences (OPD).

These parameters are, in some cases, transmitted in a frequency and time resolution adapted to the human's auditory resolution.

For the transmission, the parameters are typically quantized (or, in some cases, even have to be quantized), where often (especially for low-bit rate scenarios) a rather coarse quantization is used.

The update interval in time is determined by the encoder, depending on the signal characteristics. This means that, not for every sample of the downmix-signal, parameters are transmitted. In other words, in some cases a transmission rate (or transmission frequency, or update rate) of parameters describing the above-mentioned cues may be smaller than a transmission rate (or transmission frequency, or update rate) of audio samples (or groups of audio samples).

Instead of transmitting both inter-channel phase differences (IPDs) and overall phase differences (OPDs), it is also possible to only transmit inter-channel phase differences (IPDs) and estimate the overall phase differences (OPDs) in the decoder.

Since the decoder may, in some cases, have to apply the parameters continuously over time in a gapless manner, e.g. to each sample (or audio sample), intermediate parameters may need to be derived at decoder side, typically by interpolation between past and current parameter sets.

Some conventional interpolation approaches, however, result in poor audio quality.

In the following, a generic binaural cue coding scheme will be described, taking reference to FIG. 7. FIG. 7 shows a block schematic diagram of a binaural cue coding transmission system 800, which comprises a binaural cue coding encoder 810 and a binaural cue coding decoder 820. The binaural cue coding encoder 810 may, for example, receive a plurality of audio signals 812*a*, 812*b*, and 812*c*. Further, the binaural cue coding encoder 810 is configured to downmix the audio input signals 812*a*-812*c* using a downmixer 814 to obtain a downmix signal 816, which may, for example, be a sum signal, and which may be designated with "AS" or "X". Further, the binaural cue coding encoder 810 is configured to analyze the audio input signals 812*a*-812*c* using an analyzer 818 to obtain the side information signal 819 ("SI"). The sum signal 816 and the side information signal 819 are transmitted from the binaural cue coding encoder 810 to the binaural cue coding decoder 820. The binaural cue coding decoder 820 may be configured to synthesize a multi-channel audio output signal comprising, for example, audio channels y1, y2, . . . , yN on the basis of the sum signal 816 and inter-channel cues 824. For this purpose, the binaural cue coding decoder 820 may comprise a binaural cue coding synthesizer 822, which receives the sum signal 816 and the inter-channel cues 824, and provides the audio signals y1, y2, . . . , yN.

The binaural cue coding decoder 820 further comprises a side information processor 826, which is configured to receive the side information 819 and, optionally, a user input 827. The side information processor 826 is configured to provide the inter-channel cues 824 on the basis of the side information 819 and the optional user input 827.

To summarize, the audio input signals are analyzed and downmixed. The sum signal plus the side information is transmitted to the decoder. The inter-channel cues are generated from the side information and local user input. The binaural cue coding synthesis generates the multi-channel audio output signal.

For details, reference is made to the articles "Binaural Cue Coding Part II: Schemes and applications," by C. Faller and F. Baumgarte (published in: IEEE Transactions on Speech and Audio Processing, vol. 11, no. 6, November 2003).

However, it has been found that many conventional binaural cue coding decoders provide multi-channel output audio signals with degraded quality if the side information is quantized coarsely or with insufficient resolution.

In view of this problem, there is a need for an improved concept of upmixing a downmix audio signal into an upmixed audio signal, which reduces a degradation of the hearing impression if the side information describing a phase relationship between different channels of the upmix signal is quantized with comparatively low resolution.

SUMMARY

According to an embodiment, an apparatus for upmixing a downmix audio signal describing one or more downmix audio channels into an upmixed audio signal describing a plurality of upmixed audio channels may have: an upmixer configured to apply temporally variable upmix parameters to upmix the downmix audio signal, in order to obtain the upmixed audio signal, wherein the temporally variable upmix parameters comprise temporally variable smoothened phase values; a parameter determinator, wherein the parameter determinator is configured to obtain one or more temporally smoothened upmix parameters for usage by the upmixer on the basis of a quantized upmix parameter input information, wherein the parameter determinator is configured to combine a scaled version of a previous smoothened phase value with a scaled version of an input phase information using a phase change limitation algorithm, to determine a current smoothened phase value on the basis of the previous smoothened phase value and the input phase information.

According to another embodiment, a method for upmixing a downmix audio signal describing one or more downmix audio channels into an upmixed audio signal describing a plurality of upmixed audio channels may have the steps of: combining a scaled version of a previous smoothened phase value with a scaled version of a current phase input information using a phase change limitation algorithm, to determine a current temporally smoothened phase value on the basis of the previous smoothened phase value and the input phase information; and applying temporally variable upmix parameters, to upmix a downmix audio signal in order to obtain an upmixed audio signal, wherein the temporally variable upmix parameters comprise temporally smoothened phase values.

Another embodiment may have a non-transitory computer readable medium including a computer program for performing the inventive method for upmixing a downmix audio signal when the computer program runs on a computer.

An embodiment according to the invention creates an apparatus for upmixing a downmix audio signal describing one or more downmix audio channels into an upmixed audio signal describing a plurality of upmixed audio channels. The apparatus comprises an upmixer configured to apply temporally variable upmix parameters to upmix the downmix signal in order to obtain the upmixed audio signal. The temporally variable upmix parameters comprise temporally variable smoothened phase values. The apparatus further comprises a parameter determinator, which parameter determinator is configured to obtain one or more temporally smoothened upmix parameters to be used by the upmixer on the basis of a quantized upmix parameter input information. The parameter determinator is configured to combine a scaled version of a previous smoothened phase value with a scaled version of an input phase information using a phase change limitation algorithm, to determine a current smoothened phase value on the basis of the previous smoothened phase value and the input phase information.

This embodiment according to the invention is based on the finding that audible artifacts in the upmix signals can be reduced or even avoided by combining a scaled version of a previous smoothened phase value with a scaled version of an input phase information using a phase change limitation algorithm, because the consideration of the previous smoothened phase value in combination with a phase change limitation algorithm allows to keep discontinuities of the smoothened phase values reasonably small A reduction of discontinuities between subsequent smoothened phase values (for example, the previous smoothened phase value and the current smoothened phase value), in turn, helps to avoid (or keep sufficiently small) audible frequency variation at a transition between portions of an audio signal to which the subsequent phase values (e.g. the previous smoothened phase value and the current smoothened phase value) are applied.

To summarize the above, the invention creates a general concept of adaptive phase processing for parametric multichannel audio coding. Embodiments according to the invention supersede other techniques by reducing artifacts in the output signal caused by coarse quantization or rapid changes of phase parameters.

In an embodiment, the parameter determinator is configured to combine the scaled version of the previous smoothened phase value with the scaled version of the input phase information, such that the current smoothened phase value is in a smaller angle region out of a first angle region and a second angle region, wherein the first angle region extends, in a mathematically positive direction, from a first start direction defined by the previous smoothened phase value to a first end direction defined by the phase input information, and wherein the second angle region extends, in the mathematically positive direction, from a second start direction defined by the input phase information to a second end direction defined by the previous smoothened phase value. Accordingly, in some embodiments of the invention, a phase variation, which is introduced by a recursive (infinite impulse response type) smoothening of phase values, is kept as small as possible. Accordingly, audible artifacts are kept as small as possible. For example, the apparatus may be configured to ensure that the current smoothened phase value is located within a smaller angle range out of two angle ranges, wherein a first of the two angle ranges covers more than 180° and wherein a second of the angle ranges covers the less than 180°, and wherein the two angle ranges together cover 360°. Accordingly, it is ensured by the phase change limitation algorithm that the phase difference between the previous smoothened phase value and the current smoothened phase value is smaller than 180° and even smaller than 90°. This helps to keep audible artifacts as small as possible.

In an embodiment, the parameter determinator is configured to select a combination rule out of a plurality of different combination rules in dependence on a difference between the phase input information and the previous smoothened phase value, and to determine the current smoothened phase value using the selected combination rule. Accordingly, it can be achieved that an appropriate combination rule is chosen, which ensures that the phase change between the previous smoothened phase value and the current smoothened phase value is below a predetermined threshold or, more generally, sufficiently small or as small as possible. Accordingly, the inventive apparatus outperforms comparable apparatus, which have a fixed combination rule.

In an embodiment, the parameter determinator is configured to select a basic combination rule if a difference between the phase input information and the previous smoothened phase value is in a range between $-\pi$ and $+\pi$, and to select one or more different phase adaptation combination rules otherwise. The basic combination rule defines a linear combination without a constant summand of the scaled version of the phase input information and the scaled version of the previous smoothened phase value. The one or more phase adaptation combination rules define a linear combination, taking into account a constant phase adaptation summand, of the scaled version of the input phase information and the scaled version of the previous smoothened phase value. Accordingly, an advantageous and easy-to-implement linear combination of the previous smoothened phase value and the input phase information can be performed, wherein an additional summand can be selectively applied if the difference between the previous smoothened phase value and the input phase information takes a comparatively large value (greater than $\pi$ or smaller than $-\pi$). Accordingly, the problematic cases in which there is a large difference between the previous smoothened phase value and the input phase information can be handled with specifically adapted phase adaptation combination rules, which allows keeping the phase changes between subsequent smoothened phase values sufficiently small.

In an embodiment, the parameter determinator comprises a smoothing controller, wherein the smoothing controller is configured to selectively disable a phase value smoothing functionality if a difference between the smoothened phase quantity and the corresponding input phase quantity is larger than a predetermined threshold value. Accordingly, the phase value smoothing functionality can be disabled if there is a large change in the input phase information. Typically, very large changes of the input phase information indicate that it is, indeed, desired to perform a non-smoothened phase change, because comparatively large changes of the input phase information (significantly larger than a quantization step) are often related to specific sound events within an audio signal. Thus, a smoothing of the phase values, which improves the auditory impression in most cases, would be detrimental in this specific case. Accordingly, the auditory impression can even be improved by selectively disabling the phase value smoothing functionality.

In an embodiment, the smoothing controller is configured to evaluate, as the smoothened phase quantity, a difference between two smoothened phase values and to evaluate, as the corresponding input phase quantity, a difference between two input phase values corresponding to the two smoothened phase values. It has been found that in some cases, a difference between phase values, which are associated with different (upmixed) channels of a multi-channel audio signal, is a particularly meaningful quantity to decide whether the phase value smoothing functionality should be enabled or disabled.

In an embodiment, the upmixer is configured to apply, for a given time portion, different temporally smoothened phase rotations, which are defined by different smoothened phase values, to obtain signals of the upmixed audio channels having an inter-channel phase difference if a smoothing function (or a phase value smoothing functionality) is enabled, and to apply temporally non-smoothened phase rotations, which are defined by different non-smoothened phase values, to obtain signals of different of the upmixed audio channels having an inter-channel phase difference if the smoothing function (or the phase value smoothing functionality) is disabled. In this case, the parameter determinator comprises a smoothing controller, which smoothing controller is configured to selectively enable or disable the phase value smoothing functionality if a difference between the smoothened phase values applied to obtain the signals of the different upmixed audio channels differs from a non-smoothened inter-channel phase difference value, which is received by the upmixer or derived from a received information by the upmixer, by more than a predetermined threshold value. It has been found that a selective deactivation of the phase value smoothing functionality is particularly useful in terms of improving the hearing impression if an inter-channel phase difference value is evaluated as the criterion for activating and deactivating the phase value smoothing functionality.

In an embodiment, the parameter determinator is configured to adjust the filter time constant for determining a sequence of the smoothened phase values in dependence on a current difference between a smoothened phase value and a corresponding input phase value. By adjusting the filter time constant, it can achieved that a sufficiently small settling time is obtained for very large changes of the input phase value, while keeping the smoothing characteristics sufficiently good for lower and medium changes of the input phase value. This functionality brings along particular advantages, because a comparatively small (or, at most, medium-sized) change of the input phase value is often caused by a quantization granularity. In other words, a stepwise change of the input phase value, which is caused by a quantization granularity, may result in an efficient operation of the smoothing. In such a case, the smoothing functionality may be particularly advantageous, wherein a comparatively long filter time constant brings good results. In contrast, a very large change of the input phase value, which is significantly larger than a quantization step, typically corresponds to a desired large change of the phase value. In this case, a comparatively short filter time constant brings along good results. Accordingly, by adjusting the filter time constant in dependence on a current difference between a smoothened phase value and a corresponding input phase value, it can be reached that, intentional large changes of the input phase value result in fast changes of the smoothened phase values, while comparatively small changes of the input phase value, which take the size of a quantization step, result in a comparatively slow and smoothed transition of the smoothened phase value. Accordingly, a good hearing impression is reached both for intentional, large changes of the desired phase value and for small changes of the desired phase value (which, nevertheless, may cause a change of the input phase value by one quantization step).

In an embodiment, the parameter determinator is configured to adjust a filter time constant for determining a sequence of smoothened phase values in dependence on differences between a smoothened inter-channel phase difference, which is defined by a difference between two smoothened phase values associated with different channels of the upmixed audio signal, and a non-smoothened inter-channel phase difference, which is defined by a non-smoothened inter-channel phase difference information. It has been found that the concept of selectively adjusting the filter time constant can be used with advantage in combination with a processing of the inter-channel phase differences.

In an embodiment, the apparatus for upmixing is configured to selectively enable or disable a phase value smoothing functionality in dependence on an information extracted from an audio bit stream. It has been found that an improvement of the hearing impression may be obtained by providing the possibility to selectively enable or disable, under the control of an audio encoder, a phase value smoothing functionality in an audio decoder.

An embodiment according to the invention creates a method implementing the functionality of the above-discussed apparatus for upmixing a downmix audio signal into an upmixed audio signal. Said method is based on the same ideas as the above-discussed apparatus.

In addition, embodiments according to the invention create a computer program for performing said method.

BRIEF DESCRIPTION OF THE DRAWINGS

Embodiments of the present invention will be detailed subsequently referring to the appended drawings, in which.

DETAILED DESCRIPTION OF THE INVENTION

1. Embodiment According to FIG. 1

Figure 1:
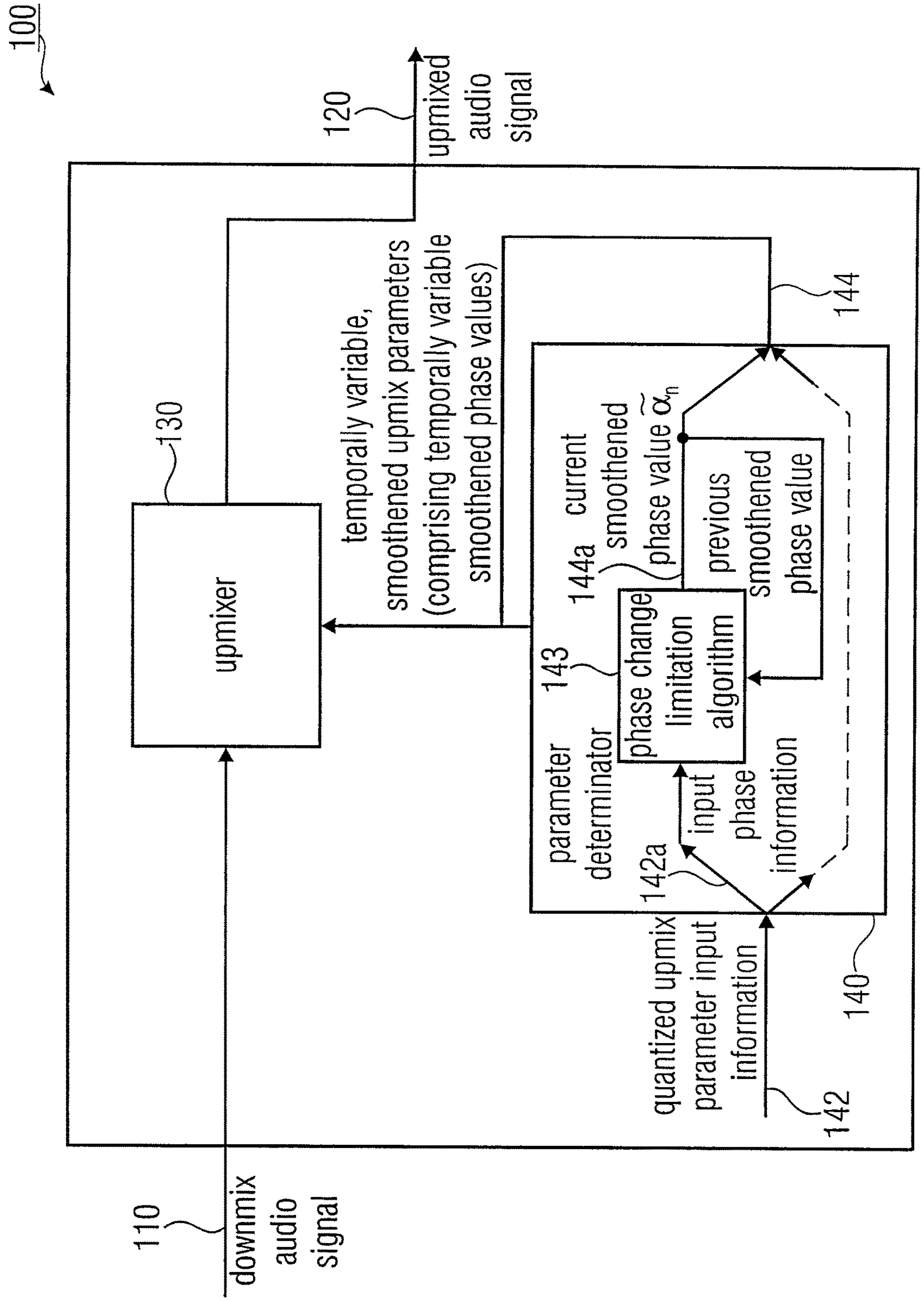
FIG. 1 shows a block schematic diagram of an apparatus for upmixing a downmix audio signal, according to an embodiment of the invention.

FIG. 1 shows a block schematic diagram of an apparatus 100 for upmixing a downmix audio signal, according to an embodiment of the invention. The apparatus 100 is configured to receive a downmix audio signal 110 describing one or more downmix audio channels and to provide an upmixed audio signal 120 describing a plurality of upmixed audio channels. The apparatus 100 comprises an upmixer 130 configured to apply temporally variable upmix parameters to upmix the downmix audio signal 110 in order to obtain the upmixed audio signal 120. The apparatus 100 also comprises a parameter determinator 140 configured to receive quantized upmix parameter input information 142. The parameter determinator 140 is configured to obtain one or more temporally smoothened upmix parameters 144 for usage by the upmixer 130 on the basis of the quantized upmix parameter input information 142.

The parameter determinator 140 is configured to combine a scaled version of a previous smoothened phase value with a scaled version of an input phase information 142*a*, which is included in the quantized upmix parameter input information 142, using a phase change limitation algorithm 146, to determine a current smoothened phase value 144*a* on the basis of the previous smoothened phase value and the input phase information. The current smoothened phase value 144*a* is included in the temporally variable, smoothened upmix parameters 144.

In the following, some details regarding the functionality of the apparatus 100 will be described. The downmix audio signal 110 is input into the upmixer 130, for example, in the form of a sequence of sets of complex values representing the dowmix audio signal in the time-frequency domain (describing overlapping or non-overlapping frequency bands or frequency subbands at an update rate determined by the encoder not shown here). The upmixer 130 is configured to linearly combine multiple channels of the downmix audio signal 110 in dependence on the temporally variable, smoothened upmix parameters and/or to linearly combine a channel of the downmix audio signal 110 with an auxiliary signal (e.g. de-correlated signal) (wherein the auxiliary signal may be derived from the same audio channel of the downmix audio signal 110, from one or more other audio channels of the downmix audio signal 110, or from a combination of audio channels of the dowmix audio signal 110). Thus, the temporally variable, smoothened upmix parameters 144 may be used by the upmixer 130 to decide upon the amplitude scaling and/or a phase rotation (or time delay) used in a generation of the upmixed audio signal 120 (or a channel thereof) on the basis of the downmix audio signal 110.

The parameter determinator 140 is typically configured to provide temporally variable, smoothened upmix parameters 144 at an update rate, which is equal to (or, in some cases, higher than) the update rate of the side information described by the quantized upmix parameter input information 142. The parameter determinator 140 may be configured to avoid (or, at least, reduce) artifacts arising from a coarse (bit rate saving) quantization of the quantized upmix parameter input information 142. For this purpose, the parameter determinator 140 may apply a smoothening of the phase information describing, for example, inter-channel phase differences. This smoothening of the input phase information 142*a*, which is included in the quantized upmix parameter input information 142, is performed using a phase change limitation algorithm 143, such that large and abrupt changes of the phase, which would result in audible artifacts, are avoided (or, at least, limited to a tolerable degree).

The smoothening is performed by combining a previous smoothened phase value with a value of the input phase information 142*a*, such that a current smoothened phase value is dependent both on the previous smoothened phase value and the current value of the input phase information 142*a*. By doing so, a particularly smooth transition can be obtained using a simple structure of the smoothing algorithm. In other words, disadvantages of a finite-impulse-response smoothing can be avoided by providing an infinite-impulse-response type smoothening in which the previous smoothened phase value is considered.

Optionally, the parameter determinator 140 may comprise an additional interpolation functionality, which is advantageous if the quantized upmix parameter input information 142 is transmitted at comparatively long temporal intervals (for example, less than once per set of spectral values of the downmix audio signal 110).

To summarize, the apparatus 100 allows for the provision of temporally variable smoothened phase values 144*a* on the basis of the quantized upmix parameter input information 142, such that the temporally variable smoothened phase values 144*a* are well-suited for the derivation of the upmixed audio signal 120 from the downmix audio signal 110 using the upmixer 130.

Audible artifacts are reduced (or even eliminated) by providing the smoothened phase value 144*a* using the above-discussed concept, wherein a consideration of a previous smoothened phase value is combined with a phase change limitation. Accordingly, a good hearing impression of the upmixed audio signal 120 is achieved.

2. Embodiment According to FIG. 2

2.1. Overview Over the Embodiment of FIG. 2

Figure 2A:
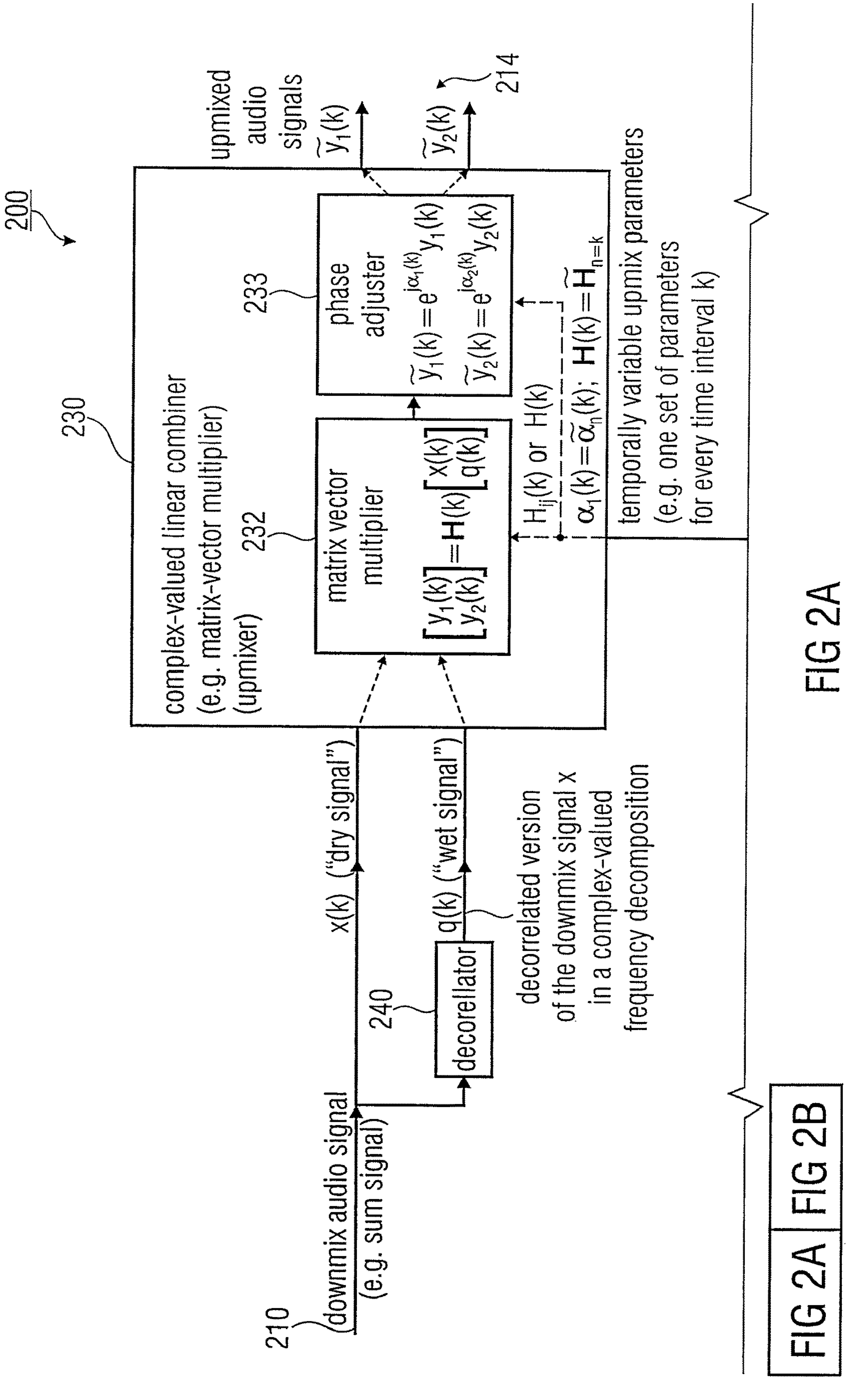
FIGS. 2*a* and 2*b* show a block schematic diagram of an apparatus for upmixing a downmix audio signal, according to another embodiment of the invention.
Figure 2B:
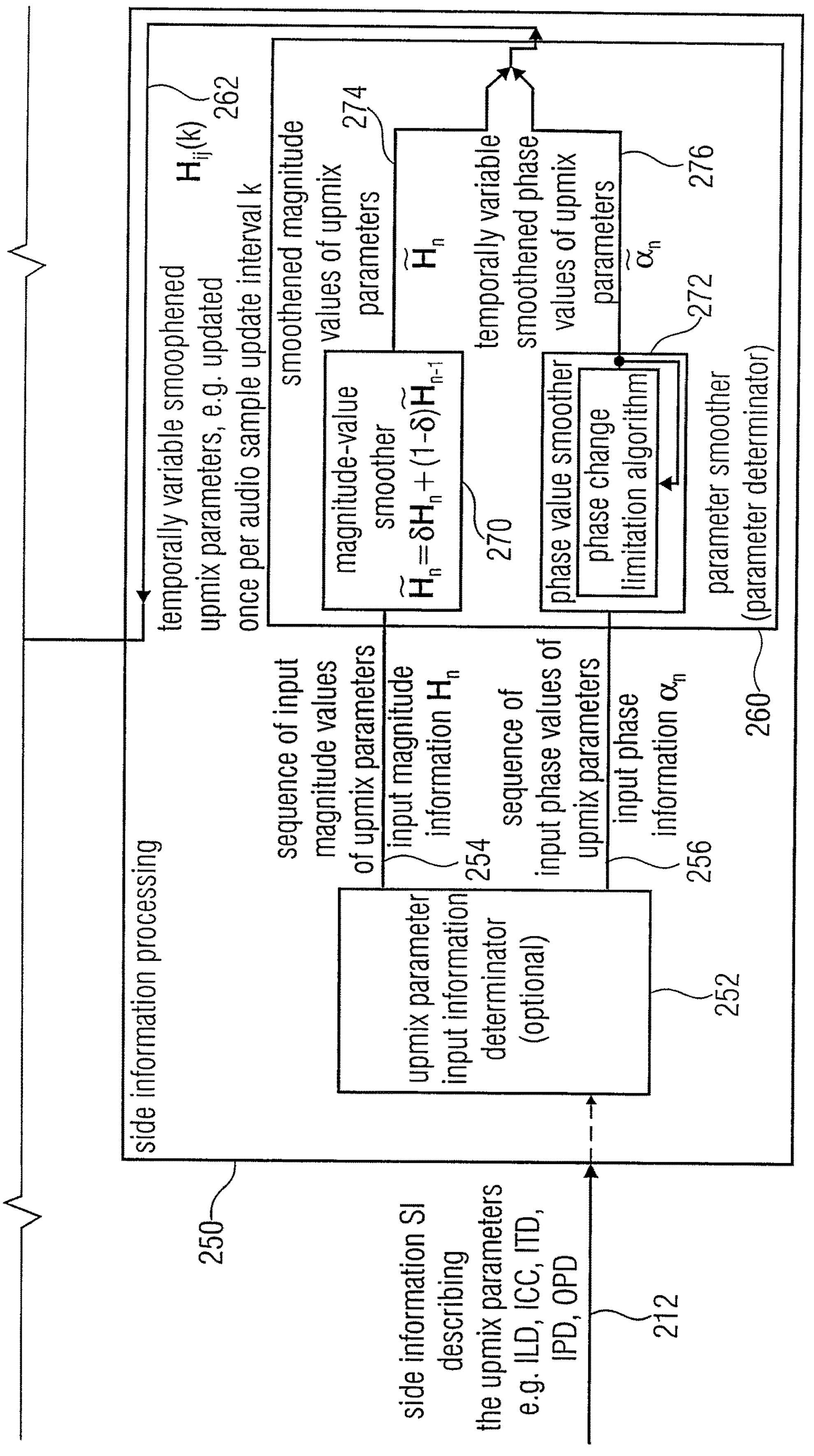

Further details regarding the structure and operation of an apparatus for upmixing an audio signal will be described taking reference to FIGS. 2*a* and 2*b*. FIGS. 2*a* and 2*b* show a detailed block schematic diagram of an apparatus 200 for mixing a downmix audio signal, according to another embodiment of the invention.

The apparatus 200 can be considered as a decoder for generating a multi-channel (e.g. 5.1) audio signal on the basis of a downmix audio signal 210 and a side information SI. The apparatus 200 implements the functionalities, which have been described with respect to the apparatus 100.

The apparatus 200 may, for example, serve to decode a multi-channel audio signal encoded according to a so-called "Binaural Cue Coding", a so-called "Parametric Stereo" or a so-called "MPEG Surround". Naturally, the apparatus 200 may similarly be used to upmix multi-channel audio signals encoded according to other systems using spatial cues.

For simplicity, the apparatus 200 is described, which performs an upmix of a single channel downmix audio signal into a two-channel signal. However, the concept described here can easily be extended to cases in which the downmix audio signal comprises more than one channel, and also to cases in which the upmixed audio signal comprises more than two channels.

2.2. Input Signals and Input Timing of the Embodiment of FIG. 2

The apparatus 200 is configured to receive the downmix audio signal 210 and the side information 212. Further, the apparatus 200 is configured to provide an upmixed audio signal 214 comprising, for example, multiple channels.

Figure 7:
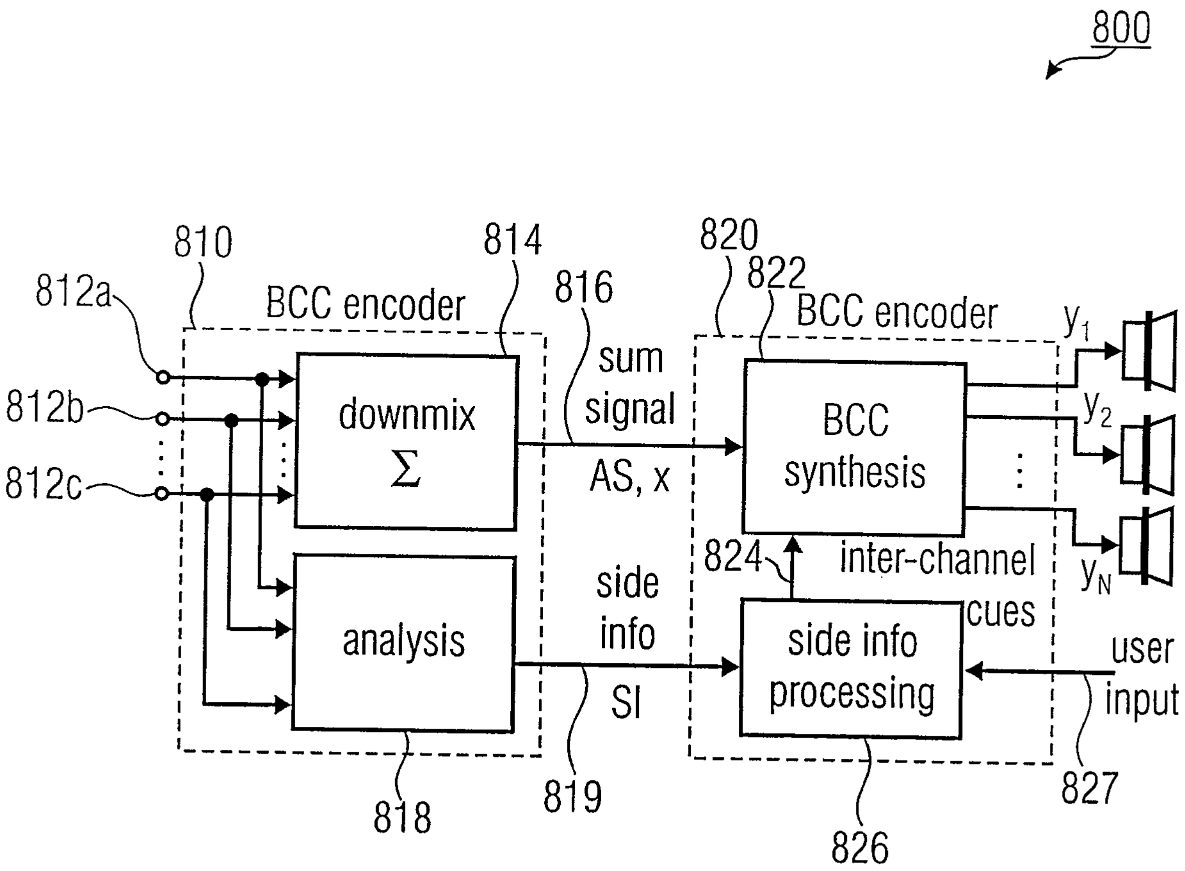
FIG. 7 shows a block schematic diagram representing a generic binaural cue coding scheme.

The downmix audio signal 210 may, for example, be a sum signal generated by an encoder (e.g. by the BCC encoder 810 shown in FIG. 7). The dowmix audio signal 210 may, for instance, be represented in a time-frequency domain, for example, in the form of a complex-valued frequency decomposition. For instance, audio contents of a plurality of frequency subbands (which may be overlapping or non-overlapping) of the audio signal may be represented by corresponding complex values. For a given frequency band, the dowmix audio signal may be represented by a sequence of complex values describing the audio content in the frequency subband under consideration for subsequent (overlapping or non-overlapping) time intervals. The subsequent complex values for subsequent time intervals may be obtained, for example, using a filterbank (e.g. QMF filterbank), a Fast Fourier Transform, or the like, in the apparatus 100 (which may be part of a multi-channel audio signal decoder), or in an additional device coupled to the apparatus 100. However, the representation of the downmix audio signal 210 described here is typically not identical to the representation of the downmix signal used for a transmission of the dowmix audio signal from a multi-channel audio signal encoder to a multi-channel audio signal decoder or to the apparatus 100. Accordingly, the downmix audio signal 210 may be represented by a stream of sets or vectors of complex values.

In the following, it will be assumed that subsequent time intervals of the downmix audio signal 210 are designated with an integer-valued index k. It will also be assumed that the apparatus 200 receives one set or vector of complex values per interval k and per channel of the downmix audio signal 210. Thus, one sample (set or vector of complex values) is received for every audio sample update interval described by time index k.

In other words, audio samples ("AS") of the downmix audio signal 210 are received by the apparatus 210, such that a single audio sample AS is associated with each audio sample update interval k.

The apparatus 200 further receives a side information 212 describing the upmix parameters. For instance, the side information 212 may describe one or more of the following upmix parameters: Inter-channel level difference (ILD), inter-channel correlation (or coherence) (ICC), inter-channel time difference (ITD), inter-channel phase difference (IPD) or overall-phase difference (OPD). Typically, the side information 212 comprises the ILD parameters and at least one out of the parameters ICC, ITD, IPD, OPD. However, in order to save bandwidth, the side information 212 is, in some embodiments, only transmitted towards, or received by, the apparatus 200 once per multiple of the audio sample update intervals k of the downmix audio signal 210 (or the transmission of a single set of side information may be temporally spread over a plurality of audio sample update intervals k). Thus, in some cases, there is only one set of side information parameters for a plurality of audio sample update intervals k. However, in other cases, there may be one set of side information parameters for each audio sample update interval k.

Intervals at which the side information is updated are designed with the index n, wherein, for the sake of simplicity only, it will be assumed in the following that the subsequent time intervals of the downmix audio signal 210, which are designated with the integer-value index k, are identical to the time intervals at which the side information SI 212 is updated, such that the relationship k=n holds. However, if an update of the side information SI 212 is performed only once per a plurality of subsequent time intervals k of the downmix audio signal 210, an interpolation may be performed, for example, between subsequent input phase information values $\alpha_n$ or subsequent smoothened phase values $\tilde{\alpha}_n$.

For example, side information may be transmitted to (or received by) the apparatus 200 at the audio sample update intervals k=4, k=8 and k=16. In contrast, no side information 212 may be transmitted to (or received by) the apparatus between said audio sample update intervals. Thus, the update intervals of the side information 212 may vary over time, as the encoder may, for example, decide to provide a side information update only when necessitated (e.g. when the decoder recognizes that the side information is changed by more than a predetermined value). For example, the side information received by the apparatus 200 for the audio sample update interval k=4 may be associated with the audio sample update intervals k=3, 4, 5. Similarly, the side information received by the apparatus 200 for the audio sample update interval k=8 may be associated with the audio sample update intervals k=6, 7, 8, 9, 10, and so on. However, a different association is naturally possible and the update intervals for the side information may naturally also be larger or smaller than discussed.

2.3. Output Signals and Output Timing of the Embodiment of FIG. 2

However, the apparatus 200 serves to provide upmixed audio signals in a complex-valued frequency composition. For example, the apparatus 200 may be configured to provide the upmixed audio signals 214, such that the upmixed audio signals comprise the same audio sample update interval or audio signal update rate as the downmix audio signal 210. In other words, for each sample (or audio sample update interval k) of the downmix audio signal 210, a sample of the upmixed audio signal 214 is generated in some embodiments.

2.4. Upmix

In the following, it will be described in detail how an update of the upmix parameters, which are used for upmixing the downmix audio signal 210, can be obtained for each audio sample update interval k even though the decoder input side information 212 may be updated, in some embodiments, only at larger update intervals. In the following, the processing for a single subband will be described, but the concept can naturally be extended to multiple subbands.

The apparatus 200 comprises, as a key component, an upmixer 230, which is configured to operate as a complex-valued linear combiner. The upmixer 230 is configured to receive a sample x(t) or x(k) of the downmix audio signal 210 (e.g. representing a certain frequency band) associated with the audio sample update interval k. The signal x(t) or x(k) is sometimes also designated as "dry signal". In addition, the upmixer 230 is configured to receive samples q(t) or q(k) representing a de-correlated version of the downmix audio signal.

Further, the apparatus 200 comprises a de-correlator (e.g. a delayer or reverberator) 240, which is configured to receive samples x(k) of the downmix audio signal and to provide, on the basis thereof, samples q(k) of a de-correlated version of the downmix audio signal (represented by x(k)). The de-correlated version (samples q(k)) of the dowmix audio signal (samples x(k)) may be designated as "wet signal".

The upmixer 230 comprises, for example, a matrix-vector multiplier 232, which is configured to perform a real-valued (or, in some cases, complex-valued) linear combination of the "dry signal" (represented by x(k)) and the "wet signal" (represented by q(k)) to obtain a first upmixed channel signal (represented by samples $y_1(k)$) and a second upmixed channel signal (represented by samples $y_2(k)$). The matrix-vector multiplier 232 may, for example, be configured to perform the following matrix-vector multiplication to obtain the samples $y_1(k)$ and $y_2(k)$ of the upmixed channel signals:

$$\begin{bmatrix} y_1(k) \\ y_2(k) \end{bmatrix} = H(k)\begin{bmatrix} x(k) \\ q(k) \end{bmatrix}$$

The matrix-vector multiplier 232, or the complex-valued linear combiner 230, may further comprise a phase adjuster 233, which is configured to adjust phases of the samples $y_1(k)$ and $y_2(k)$ representing the upmixed channel signals. For example, the phase adjustor 233 may be configured to obtain the phase-adjusted first upmixed channel signal, which is represented by samples $\tilde{y}_1(k)$ according to $$\tilde{y}_1(k)=e^{j\alpha_1(k)}y_1(k),$$

and to obtain the phase adjusted second upmixed channel signal, which is represented by samples $\tilde{y}_2(k)$, according to $$\tilde{y}_2(k)=e^{j\alpha_2(k)}y_2(k).$$

Accordingly, the upmixed audio signal 214, samples of which are designated with $\tilde{y}_1(k)$ and $\tilde{y}_2(k)$, is obtained on the basis of the dry signal and the wet signal, by the complex-valued linear combiner 230 using the temporally variable upmix parameters. The temporally variable smoothened phase values $\tilde{\alpha}_n$ are used to determine the phases (or inter-channel phase differences) of the upmixed audio signals $\tilde{y}_1(k)$ and $\tilde{y}_2(k)$. For example, the phase adjustor 232 may be configured to apply the temporally variable smoothened phase values. However, alternatively, the temporally variable smoothened phase values may already be used by the matrix vector multiplier 232 (or even in the generation of the entries of the matrix H). In this case, the phase adjuster 233 may be omitted entirely.

2.5 Update Of The Upmix Parameters

As can be seen from the above equations, it is desirable to update the upmix parameter matrix H(k) and the upmix channel phase values $\alpha_1(k)$, $\alpha_2(k)$ for each audio sample update interval k. Updating the upmix parameter matrix for each audio sample update interval k brings the advantage that the upmix parameter matrix is well-adapted to the actual acoustic environment. Updating the upmix parameter matrix for every audio sample update interval k also allows keeping step-wise changes of the upmix parameter matrix H (or of the entries thereof) between subsequent audio sample intervals k small, as changes of the upmix parameter matrix are distributed over multiple audio sample update intervals, even if the side information 212 is updated only once per multiple of the audio sample update intervals k. Also, it is desirable to smoothen any changes of the upmix parameter matrix H which would arise from a quantization of the side information SI, 212. Similarly, it is desirable to update the upmix channel phase values $\alpha_1(k)$ and $\alpha_2(k)$ sufficiently often, in order to avoid, at least during a continuous audio signal, step-wise changes of said upmix channel phase values. Also, it is desirable to temporally smoothen the upmix channel phase values, in order to reduce or avoid artifacts that could be caused by a quantization of the side information SI, 212.

The apparatus 200 comprises a side information processing unit 250, which is configured to provide the temporally variable upmix parameters 262, for instance, the entries $H_{ij}(k)$ of the matrix H(k) and the upmix channel phase values $\alpha_1(k)$, α2(k), on the basis of the side information 212. The side information processing unit 250 is, for example, configured to provide an updated set of upmix parameters for every audio sample update interval k, even if the side information 212 is updated only once per multiple audio sample update intervals k. However, in some embodiments the side information processing 250 may be configured to provide an updated set of temporally variable smoothing upmix parameter less often, for example only once per update of the side information SI, 212.

The side information processing unit 250 comprises an upmix parameter input information determinator 252, which is configured to receive the side information 212 and to derive, on the basis thereof, one or more upmix parameters (for example in the form of a sequence 254 of magnitude values of upmix parameters and a sequence 256 of phase values of upmix parameters), which may be considered as a upmix parameter input information (comprising, for example, an input magnitude information 254 and an input phase information 256). For example, the upmix parameter input information determinator 252 may combine a plurality of cues (e.g., ILD, ICC, ITD, IPD, OPD) to obtain the upmix parameter input information 254, 256, or may individually evaluate one or more of the cues. The upmix parameter input information determinator 252 is configured to describe the upmix parameters in the form of a sequence 254 of input magnitude values (also designated as input magnitude information) and a separate sequence 256 of input phase values (also designated as input phase information). The elements of the sequence 256 of input phase values may be considered as an input phase information $\alpha_n$. The input magnitude values of the sequence 254 may, for example, represent an absolute value of a complex number, and the input phase values of the sequence 256 may, for example, represent an angle value (or phase value) of the complex number (measured, for example, with respect to a real-part-axis in a real-part-imaginary-part orthogonal coordinate system).

Thus, the upmix parameter input information determinator 252 may provide the sequence 254 of input magnitude values of upmix parameters and the sequence 256 of input phase values of upmix parameters. The upmix parameter input information determinator 252 may be configured to derive from one set of side information a complete set of upmix parameters (for example, a complete set of matrix elements of the matrix H and a complete set of phase values $\alpha_1$, $\alpha_2$). There may be an association between a set of side information 212 and a set of input upmix parameters 254, 256. Accordingly, the upmix parameter input information determinator 252 may be configured to update the input upmix parameters of the sequences 254, 256 once per upmix parameter update interval, i.e., once per update of the set of side information.

The side information processing unit further comprises a parameter smoother (sometimes also designated briefly as "parameter determinator") 260, which will be described in detail in the following. The parameter smoother 260 is configured to receive the sequence 254 of the (real-valued) input magnitude values of upmix parameters (or matrix elements) and the sequence 256 of (real-valued) input phase values of upmix parameters (or matrix elements), which may be considered as an input phase information an. Further, the parameter smoother is configured to provide a sequence of temporally variable smoothened upmix parameters 262 on the basis of a smoothing of the sequence 254 and the sequence 256.

The parameter smoother 260 comprises a magnitude-value smoother 270 and a phase value smoother 272.

The magnitude-value smoother is configured to receive the sequence 254 and provide, on the basis thereof, a sequence 274 of smoothened magnitude values of upmix parameters (or of matrix elements of a matrix $\tilde{H}_n$). The magnitude value smoother 270 may, for example, be configured to perform a magnitude value smoothing, which will be discussed in detail below.

Similarly, the phase value smoother 272 may be configured to receive the sequence 256 and to provide, on the basis thereof, a sequence 276 of temporally variable smoothened phase values of upmix parameters (or of matrix values). The phase value smoother 272 may, for example, be configured to perform a smoothing algorithm, which will be described in detail below.

In some embodiments, the magnitude value smoother 270 and the phase value smoother are configured to perform the magnitude value smoothing and the phase value smoothing separately or independently. Thus, the magnitude values of the sequence 254 do not affect the phase value smoothing, and the phase values of the sequence 256 do not affect the magnitude value smoothing. However, it is assumed that the magnitude value smoother 270 and the phase value smoother 272 operate in a time-synchronized manner such that the sequences 274, 276 comprise corresponding pairs of smoothened magnitude values and smoothened phase values of upmix parameters.

Typically, the parameter smoother 260 acts separately on different upmix parameters or matrix elements. Thus, the parameter smoother 260 may receive one sequence 254 of magnitude values for each upmix parameter (out of a plurality of upmix parameters) or matrix element of the matrix H. Similarly, the parameter smoother 260 may receive one sequence 256 of input phase values $\alpha_n$ for phase adjustment of each upmixed audio channel.

2.6 Details Regarding The Parameter Smoothing

In the following, details regarding an embodiment of the present invention, which reduces phase processing artifacts caused by the quantization of IPDs/OPDs and/or the estimation of OPDs in a decoder, will be described. For simplicity, the following description restricts to an upmix from one to two channels only, without restricting the general case of an upmix from m to n channels, where the same techniques could be applied.

The decoder's upmix procedure from, for example, one to two channels is carried out by a matrix multiplication of a vector consisting of the downmix signal x (also designated with x(k)), called the dry signal, and a decorrelated version of the downmix signal q (also designated with q(k)), called the wet signal, with an upmix matrix H. The wet signal q has been generated by feeding the downmix signal x through a de-correlation filter 240. The upmix signal y is a vector containing the first and second channel (e.g., $y_1(k)$ and $y_2(k)$) of the output. All signals x, q, y may be available in a complex-valued frequency decomposition (e.g., time-frequency-domain representation).

This matrix operation is performed (for example, separately) for all subband samples of every frequency band (or at least for some subband samples of some frequency bands). For instance, the matrix operation may be performed in accordance with the following equation:

$$\begin{bmatrix} y_1 \\ y_2 \end{bmatrix} = H \begin{bmatrix} x \\ q \end{bmatrix}.$$

The coefficients of the upmix matrix H are derived from the spatial cues, typically ILDs and ICCs, resulting in real-valued matrix elements that basically perform a mix of dry and wet signals for each channel based on the ICCs, and adjust the output levels of both output channels as determined by the ILDs.

For the transmission of the spatial cues (e.g., ILD, ICC, ITD, IPD and/or OPD) it is desirable (or even necessitated) to quantize some or all types of parameters in the encoder. Especially for low bit rate scenarios, it is often desirable (or even necessitated) to use a rather coarse quantization to reduce the amount of transmitted data. However, for certain types of signals, a coarse quantization may result in audible artifacts. To reduce these artifacts, a smoothing operation may be applied to the elements of the upmix matrix H to smooth the transition between adjacent quantizer steps, which is causing the artifacts.

The smoothing is performed, for example, by a simple low-pass filtering of the matrix elements:

$$\tilde{H}_n = \delta H_n + (1-\delta)\tilde{H}_{n-1}$$

This smoothing may, for example, be performed by the magnitude value smoother 270, wherein the current input magnitude information $H_n$ (e.g. provided by the upmix parameter input information determinator 252 and designated with 254) may be combined with a previous smoothened magnitude value (or magnitude matrix) $\tilde{H}_{n-1}$, in order to obtain a current smoothened magnitude value (or magnitude matrix) $\tilde{H}_n$.

As smoothing may have a negative effect on signal portions, where the spatial parameters change rapidly, the smoothing may be controlled by additional side information transmitted from the encoder.

In the following, the application and determination of the phase values will be described in more detail. If IPDs and/or OPDs are used, an additional phase shift may be may be applied to the output signals (for example, to the signals defined by the samples $y_1(k)$ and $y_2(k)$). The IPD describes the phase difference between the two channels (for example, the phase-adjusted first upmix channel signal defined by the samples $\tilde{y}_1(k)$ and the phase-adjusted second upmix channel signal defined by the samples $\tilde{y}_2(k)$) while on OPD describes a phase difference between one channel and the downmix.

Figure 3:
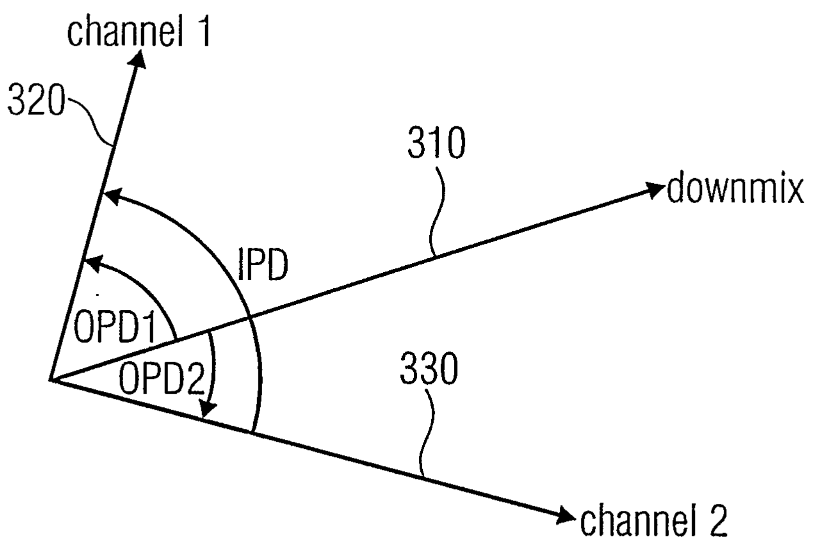
FIG. 3 shows a schematic representation of overall phase differences OPD1, OPD2 and an inter-channel phase difference IPD.

In the following, the definition of the IPDs and the OPDs will be briefly explained taking reference to FIG. 3, which shows a schematic representation of phase relationships between the downmix signal and a plurality of channel signals. Taking reference now to FIG. 3, a phase of the downmix signal (or of a spectral coefficient x(k) thereof) is represented by a first pointer 310. A phase of a phase-adjusted first upmixed channel signal (or of a spectral coefficient $\tilde{y}_1(k)$ thereof) is represented by a second pointer 320. A phase difference between the downmix signal (or a spectral value or coefficient thereof) and the phase-adjusted first upmixed channel signal (or a spectral coefficient thereof) is designated with OPD1. A phase-adjusted second upmix channel signal (or a spectral coefficient $\tilde{y}_2(k)$ thereof) is represented by a third pointer 330. A phase difference between the downmix signal (or the spectral coefficient thereof) and the phase-adjusted second upmixed channel signal (or the spectral coefficient thereof) is designated with OPD2. A phase difference between the phase-adjusted first upmixed channel signal (or a spectral coefficient thereof) and the phase-adjusted second upmixed channel signal (or a spectral coefficient thereof) is designated with IPD.

To reconstruct the phase properties of the original signal (for example, to provide the phase-adjusted first upmixed channel signal and the phase-adjusted second upmixed channel signal with appropriate phases on the basis of the dry signal) the OPDs for both channels should be known. Often, the IPD is transmitted together with one OPD (the second OPD can then be calculated from these). To reduce the amount of transmitted data, it is also possible to only transmit IPDs and to estimate the OPDs in the decoder, using the phase information contained in the downmix signal together with the transmitted ILDs and IPDs. This processing may, for example, be performed by the upmix parameter input information determinator 252.

The phase reconstruction in the decoder (for example, in the apparatus 200) is performed by a complex rotation of the output subband signals (for example of the signals described by the spectral coefficient $y_1(k)$, $y_2(k)$) in accordance with the following equations:

$$\tilde{y}_1 = e^{j\alpha_1} y_1$$

$$\tilde{y}_2 = e^{j\alpha_2} y_2,$$

In the above equations, the angles $\alpha_1$ and $\alpha_2$ are equal to the OPDs for the two channels (or, for example, the smoothened OPDs).

As described above, coarse quantization of parameters (for example ILD parameters and/or ICC parameters) can result in audible artifacts, which is also true for quantization of IPDs and OPDs. As the above described smoothing operation is applied to the elements of the upmix matrix $H_n$, it only reduces artifacts caused by quantization of ILDs and ICCs, while those caused by quantization of phase parameters are not affected.

Furthermore, additional artifacts may be introduced by the above-described time-variant phase rotation, which is applied to each output channel. It has been found that, if the phase shift angles $\alpha_1$ and $\alpha_2$ fluctuate rapidly over time, the applied rotation angle may cause a short dropout or a change of the instantaneous signal frequency.

Both of these problems can be reduced significantly by applying a modified version of the above-described smoothing approach to the angles $\alpha_1$ and $\alpha_2$. As in this case, the smoothing filter is applied to angles, which wrap around every $2\pi$, it is advantageous to modify the smoothing filter by a so-called unwrapping. Accordingly, a smoothened phase value $\tilde{\alpha}_n$ is computed according to the following algorithm, which typically provides for a limitation of a phase change:

$$\tilde{\alpha}_n = \begin{cases} (\delta(\alpha_n - 2\pi) + (1-\delta)\tilde{\alpha}_{n-1}) \bmod 2\pi & \text{if } (\alpha_n - \tilde{\alpha}_{n-1}) > \pi \\ (\delta(\alpha_n + 2\pi) + (1-\delta)\tilde{\alpha}_{n-1}) \bmod 2\pi & \text{if } (\alpha_n - \tilde{\alpha}_{n-1}) < -\pi \\ \delta\alpha_n + (1-\delta)\tilde{\alpha}_{n-1} & \text{else} \end{cases}$$

In the following, the functionality of the above-described algorithm will be briefly discussed taking reference to FIGS. 4*a*, 4*b*, 5*a* and 5*b*. Taking reference to the above equation or algorithm for the computation of the current smoothened phase value $\tilde{\alpha}_n$, it can be seen that the current smoothened phase value $\tilde{\alpha}_n$ is obtained by a weighted linear combination, without an additional summand, of the current input phase information $\alpha_n$ and the previous smoothened phase value $\tilde{\alpha}_{n-1}$, if a difference between the values $\alpha_n$ and $\tilde{\alpha}_{n-1}$ is smaller than or equal to $\pi$ ("else" case of the above equation). Assuming that $\delta$ is a parameter between zero and one (excluding zero and one), which determines (or represents) a time constant of the smoothing process, the current smoothened phase value $\tilde{\alpha}_n$ will lie between the values of $\alpha_n$ and $\tilde{\alpha}_{n-1}$. For example, if $\delta$=0.5, the value of $\tilde{\alpha}_n$ is the average (arithmetic mean) between $\tilde{\alpha}_n$ and $\tilde{\alpha}_{n-1}$.

However, if the difference between $\alpha_n$ and $\alpha_{n-1}$ is larger than $\pi$, the first case (line) of the above equation is fulfilled. In this case, the current smoothened phase value $\tilde{\alpha}_n$ is obtained by a linear combination of $\alpha_n$ and $\tilde{\alpha}_{n-1}$, taking into consideration a constant phase modification term $-2\pi\delta$. Accordingly, it is achieved that a difference between $\tilde{\alpha}_n$ and $\alpha_{n-1}$ is kept sufficiently small. An example of this situation is shown is FIG. 4*a*, wherein the phase $\tilde{\alpha}_{n-1}$ is illustrated by a first pointer 410, the phase $\alpha_n$ is illustrated by a second pointer 412 and the phase $\tilde{\alpha}_n$ is illustrated by a third pointer 414.

Figure 4A:
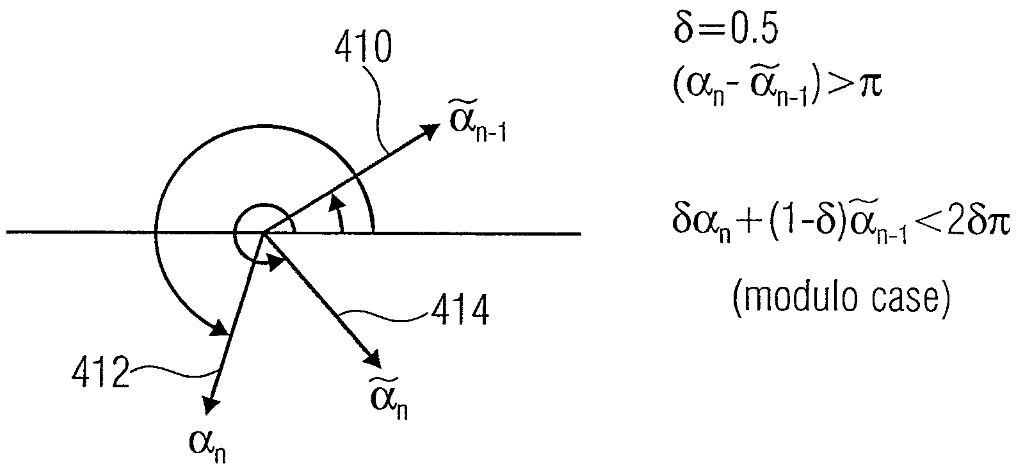
FIGS. 4*a* and 4*b* show graphical representations of phase relationships for a first case of the phase change limitation algorithm.
Figure 4B:
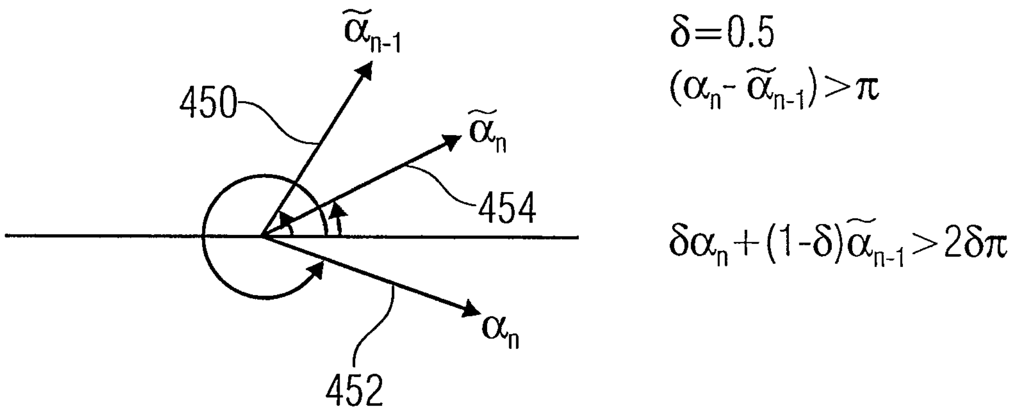

FIG. 4*b* illustrates the same situation for different values $\tilde{\alpha}_{n-1}$ and $\alpha_n$. Again, the phase values $\tilde{\alpha}_{n-1}$, $\alpha_n$ and $\tilde{\alpha}_n$ are illustrated by pointers 450, 452, 454.

Again, it is achieved that the angle difference between $\tilde{\alpha}_n$ and $\tilde{\alpha}_{n-1}$ is kept sufficiently small. In both cases, the direction defined by the phase value $\tilde{\alpha}_n$ is the smaller one of two angle regions, wherein the first of the two angle regions would be covered by rotating the pointer 410, 450 towards the pointer 412, 452 in a mathematically positive (counter-clockwise) direction, and wherein the second angle region would be covered by rotating the pointer 412, 452 towards the pointers 410, 450 in the mathematically positive (counter-clockwise) direction.

Figure 5A:
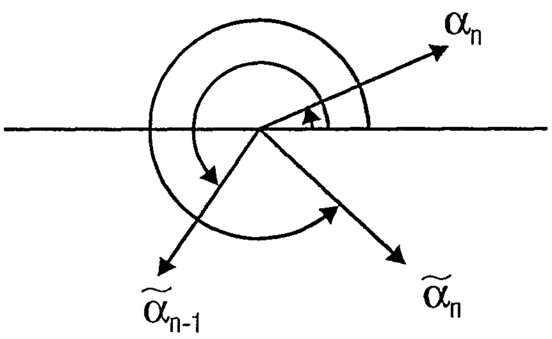
FIGS. 5*a* and 5*b* show graphical representations of phase relationships for a second case of the phase change limitation algorithm.
Figure 5B:
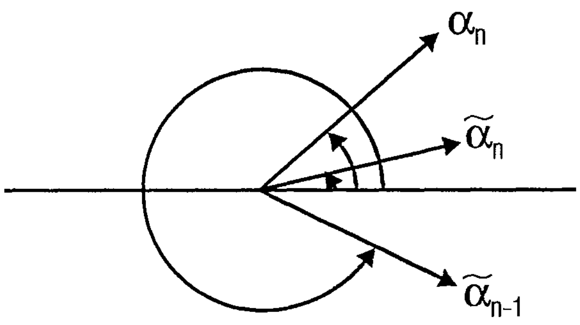

However, if it is found that the difference between the phase values $\alpha_n$ and $\tilde{\alpha}_{n-1}$ is smaller than $-\pi$, the value of $\tilde{\alpha}_n$ is obtained using the second case (line) of the above equation. The phase value $\tilde{\alpha}_n$ is obtained by a linear combination of the phase values $\alpha_n$ and $\tilde{\alpha}_{n-1}$, with a constant phase adaptation term $2\pi\delta$. Examples of this case, in which $\alpha_n-\tilde{\alpha}_{n-1}$ is smaller than $-\pi$, are illustrated in FIGS. 5*a* and 5*b*.

To summarize, the phase value smoother 272 may be configured to select different phase value calculation rules (which may be linear combination rules) in dependence on the difference between the values $\alpha_n$ and $\tilde{\alpha}_{n-1}$.

2.7 Optional Extensions of the Smoothening Concept

In the following, some optional extensions of the above-discussed phase value smoothing concept will be discussed. As for the other parameters (e.g., ILD, ICC, ITD) there may be signals, where a fast change of the rotation angles is necessitated, for example, if the IPD of the original signal (for example a signal processed by an encoder) changes rapidly. For such signals, the smoothing, which is performed by the phase value smoother 272, would (in some cases) have a negative effect on the output quality and should not be applied in such cases. To avoid a possible bit rate overhead necessitated for controlling the smoothing from the encoder for every signal processing band, an adaptive smoothing control (for example, implemented using a smoothing controller) can be used in the decoder (for example in the apparatus 200): the resulting IPD (i.e., the difference between the two smoothed angles, for example between the angles $\alpha_1(k)$ and $\alpha_2(k)$) is computed and is compared to the transmitted IPD (for example an inter-channel phase difference described by the input phase information $\alpha_n$). If a difference is greater than a certain threshold, smoothing may be disabled and the unprocessed angles (for example the angles $\alpha_n$ described by the input phase information and provided by the upmix parameter input information determinator) may be used (for example by the phase adjuster 233), and otherwise the low-pass filtered angle (e.g., the smoothened phase values $\tilde{\alpha}_n$ provided by the phase value smoother 272) may be applied to the output signal (for example by the phase adjuster 233).

In an (optional) advanced version, the algorithm, which is applied by the phase value smoother 272, could be extended using a variable filter time constant, which is modified based on the current difference between processed and unprocessed IPDs. For example, the value of the parameter $\delta$ (which determines the filter time constant) can be adjusted in dependence on a difference between the current smoothened phase value $\tilde{\alpha}_n$ and the current input phase value $\alpha_n$, or in dependence on a difference between the previous smoothened phase value $\tilde{\alpha}_{n-1}$ and the current input phase value $\alpha_n$.

In some embodiments, additionally a single bit can (optionally) be transmitted in the bit stream (which represents the downmix audio signal 210 and the side information 212) to completely enable or disable the smoothing from the encoder for all bands in case of certain critical signals, for which the adaptive smoothing control does not give optimal results.

3. Conclusion

To summarize the above, a general concept of adaptive phase processing for parametric multi-channel audio coding has been described. Embodiments according to the current invention supersede other techniques by reducing artifacts in the output signal caused by coarse quantization or rapid changes of phase parameters.

4. Method

Figure 6:
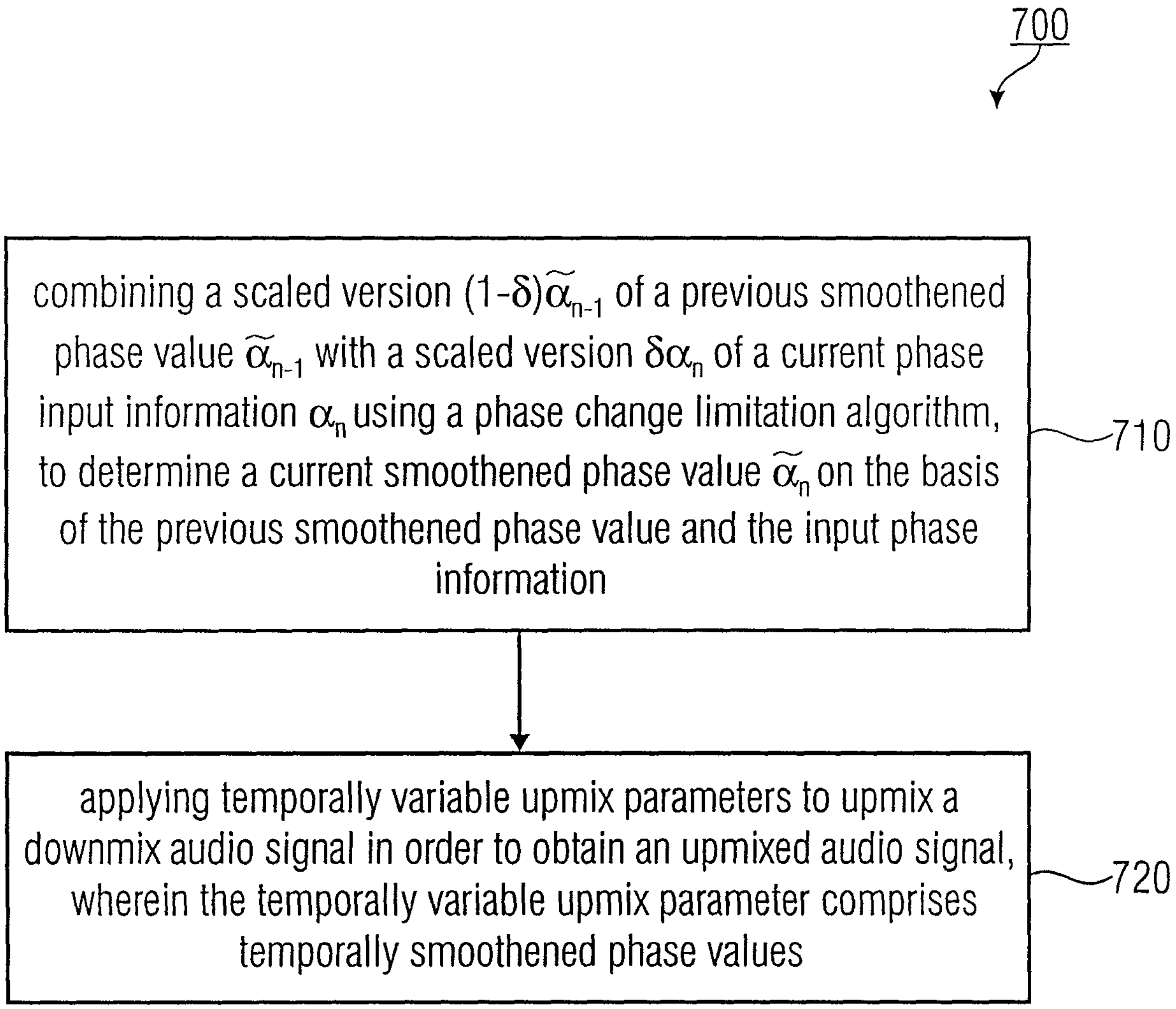
FIG. 6 shows a flow chart of a method for upmixing a downmix audio signal into an upmixed audio signal, according to an embodiment of the invention.

An embodiment according to the invention comprises a method for upmixing a downmix audio signal describing one or more downmix audio channels into an upmixed audio signal describing a plurality of upmixed audio channels. FIG. 6 shows a flow chart of such a method, which is designated in its entirety with 700.

The method 700 comprises a step 710 of combining a scaled version of a previous smoothened phase value with a scaled version of a current phase input information using a phase change limitation algorithm, to determine a current smoothened phase value on the basis of the previous smoothened phase value and the input phase information.

The method 700 also comprises a step 720 of applying temporally variable upmix parameters to upmix a downmix audio signal in order to obtain an upmixed audio signal, wherein the temporally variable upmix parameter comprises temporally smoothened phase values.

Naturally, the method 700 can be supplemented by any of the features and functionalities, which are described herein with respect to the inventive apparatus.

5. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] C. Faller and F. Baumgarte, "Efficient representation of spatial audio using perceptual parameterization", IEEE WASPAA, Mohonk, NY, October 2001

[2] F. Baumgarte and C. Faller, "Estimation of auditory spatial cues for binaural cue coding", ICASSP, Orlando, FL, May 2002

[3] C. Faller and F. Baumgarte, "Binaural cue coding: a novel and efficient representation of spatial audio," ICASSP, Orlando, FL, May 2002

[4] C. Faller and F. Baumgarte, "Binaural cue coding applied to audio compression with flexible rendering", AES 113th Convention, Los Angeles, Preprint 5686, October 2002

[5] C. Faller and F. Baumgarte, "Binaural Cue Coding—Part II: Schemes and applications," IEEE Trans, on Speech and Audio Proc., vol. 11, no. 6, November 2003

[6] J. Breebaart, S. van de Par, A. Kohlrausch, E. Schuijers, "High-Quality Parametric Spatial Audio Coding at Low Bitrates", AES 116th Convention, Berlin, Preprint 6072, May 2004

[7] E. Schuijers, J. Breebaart, H. Purnhagen, J. Engdegard, "Low Complexity Parametric Stereo Coding", AES 116th Convention, Berlin, Preprint 6073, May 2004

[8] ISO/IEC JTC 1/SC 29/WG 11, 23003-1, MPEG Surround

[9] J. Blauert, Spatial Hearing: The Psychophysics of Human Sound Localization, The MIT Press, Cambridge, MA, revised edition 1997

The invention claimed is:

1. An apparatus for upmixing a downmix audio signal describing one or more downmix audio channels into an upmixed audio signal describing a plurality of upmixed audio channels, the apparatus comprising:

an upmixer configured to apply temporally variable upmix parameters to upmix the downmix audio signal, in order to acquire the upmixed audio signal; and a parameter determinator, wherein the parameter determinator is configured to acquire one or more temporally smoothened upmix parameters for usage by the upmixer on the basis of an upmix parameter input information and using a phase change limitation algorithm; wherein the parameter determinator is configured to acquire a current smoothened phase value $\tilde{\alpha}_n$ according to the following equation:

$$\tilde{\alpha}_n = \begin{cases} (\delta(\alpha_n - 2\pi) + (1-\delta)\tilde{\alpha}_{n-1})\bmod 2\pi & \text{if } (\alpha_n - \tilde{\alpha}_{n-1}) > \pi \\ (\delta(\alpha_n + 2\pi) + (1-\delta)\tilde{\alpha}_{n-1})\bmod 2\pi & \text{if } (\alpha_n - \tilde{\alpha}_{n-1}) < -\pi \\ \delta\alpha_n + (1-\delta)\tilde{\alpha}_{n-1} & \text{else} \end{cases}$$

wherein $\tilde{\alpha}_{n-1}$ designates a previous smoothened phase value;

$\alpha_n$ designates an input phase information;

"mod" designates a MODULO-operator; and $\delta$ designates a smoothing parameter, a value of which is in an interval between zero and one, excluding boundaries of the interval.

2. The apparatus according to claim 1, wherein the parameter determinator is configured to combine a scaled version of the previous smoothened phase value with a scaled version of the input phase information, such that the current smoothened phase value is in a smaller angle region out a first angle region and a second angle region, wherein the first angle region extends, in a mathematically positive direction, from a first start direction defined by the previous smoothened phase value to a first end direction defined by the input phase information, and wherein the second angle region extends, in a mathematically positive direction, from a second start direction defined by the input phase information to a second end direction defined by the previous smoothened phase value.

3. The apparatus according to claim 1, wherein the parameter determinator is configured to select a combination rule out of a plurality of different combination rules in dependence on a difference between the input phase information and the previous smoothened phase value, and to determine the current smoothened phase value using the selected combination rule.

4. The apparatus according to claim 3, wherein the parameter determinator is configured to select a basic phase combination rule, if the difference between the input phase information and the previous smoothened phase value is in a range between $-\pi$ and $+\pi$, and to select one or more different phase adaptation combination rules otherwise;

wherein the basic phase combination rule defines a linear combination, without a constant summand, of a scaled version of the input phase information and a scaled version of the previous smoothened phase value; and wherein the one or more phase adaptation combination rules define a linear combination, taking into account a constant phase adaptation summand, of the scaled version of the input phase information and the scaled version of the previous smoothened phase value.

5. The apparatus according to claim 1, wherein the parameter determinator comprises a smoothing controller, wherein the smoothing controller is configured to selectively disable a phase value smoothing functionality if a difference between a smoothened phase quantity and a corresponding input phase quantity is larger than a predetermined threshold value.

6. The apparatus according to claim 5, wherein the smoothing controller is configured to evaluate, as the smoothened phase quantity, a difference between two smoothened phase values, and to evaluate, as the corresponding input phase quantity, a difference between two input phase values corresponding to the two smoothened phase values.

7. The apparatus according to claim 1, wherein the upmixer is configured to apply, for a given time portion, different temporally smoothened phase rotations, which are defined by different smoothened phase values, to acquire signals of different of the upmixed audio channels comprising an inter-channel phase difference, if a smoothing function is enabled, and to apply temporally non-smoothened phase rotations, which are defined by different non-smoothened phase values, to acquire signals of different of the upmixed audio channels comprising an inter-channel phase difference, if the smoothing function is disabled;

wherein the parameter determinator comprises a smoothing controller; and wherein the smoothing controller is configured to selectively disable a phase value smoothing function if a difference between the smoothened phase values applied to acquire the signals of the different upmixed audio channels differs from a non-smoothened inter-channel phase difference value, which is received by the apparatus or derived from a received information by the apparatus, by more than a predetermined threshold value.

8. The apparatus according to claim 1, wherein the parameter determinator is configured to adjust a filter time constant for determining a sequence of smoothened phase values in dependence on a current difference between a smoothened phase value and a corresponding input phase value.

9. The apparatus according to claim 1, wherein the parameter determinator is configured to adjust a filter time constant for determining a sequence of smoothened phase values in dependence on a difference between a smoothened inter-channel phase difference which is defined by a difference between two smoothened phase values associated with different channels of the upmixed audio signal, and a non-smoothened inter-channel phase difference, which is defined by a non-smoothened inter-channel phase difference information.

10. The apparatus according to claim 1, wherein the apparatus for upmixing is configured to selectively enable and disable a phase value smoothing function in dependence on an information extracted from an audio bitstream.

11. A method for upmixing a downmix audio signal describing one or more downmix audio channels into an upmixed audio signal describing a plurality of upmixed audio channels, the method comprising:

acquiring one or more temporally smoothened upmix parameters for usage by an upmixing on the basis of an upmix parameter input information and using a phase change limitation algorithm; and applying temporally variable upmix parameters, to upmix a downmix audio signal in order to acquire an upmixed audio signal; wherein a current smoothened phase value $\tilde{\alpha}_n$ is acquired according to the following equation:

$$\tilde{\alpha}_n = \begin{cases} (\delta(\alpha_n - 2\pi) + (1-\delta)\tilde{\alpha}_{n-1}) \bmod 2\pi & \text{if } (\alpha_n - \tilde{\alpha}_{n-1}) > \pi \\ (\delta(\alpha_n + 2\pi) + (1-\delta)\tilde{\alpha}_{n-1}) \bmod 2\pi & \text{if } (\alpha_n - \tilde{\alpha}_{n-1}) < -\pi \\ \delta\alpha_n + (1-\delta)\tilde{\alpha}_{n-1} & \text{else} \end{cases}$$

wherein $\tilde{\alpha}_{n-1}$ designates a previous smoothened phase value;

$\alpha_n$ designates an input phase information;

"mod" designates a MODULO-operator; and $\delta$ designates a smoothing parameter, a value of which is in an interval between zero and one, excluding boundaries of the interval.

12. A non-transitory computer readable medium including a computer program for performing the method for upmixing a downmix audio signal describing one or more downmix audio channels into an upmixed audio signal describing a plurality of upmixed audio channels, the method comprising:

acquiring one or more temporally smoothened upmix parameters for usage by an upmixing on the basis of an upmix parameter input information and using a phase change limitation algorithm; and applying temporally variable upmix parameters, to upmix a downmix audio signal in order to acquire an upmixed audio signal, when the computer program runs on a computer; wherein a current smoothened phase value $\tilde{\alpha}_n$ is acquired according to the following equation:

$$\tilde{\alpha}_n = \begin{cases} (\delta(\alpha_n - 2\pi) + (1-\delta)\tilde{\alpha}_{n-1}) \bmod 2\pi & \text{if } (\alpha_n - \tilde{\alpha}_{n-1}) > \pi \\ (\delta(\alpha_n + 2\pi) + (1-\delta)\tilde{\alpha}_{n-1}) \bmod 2\pi & \text{if } (\alpha_n - \tilde{\alpha}_{n-1}) < -\pi \\ \delta\alpha_n + (1-\delta)\tilde{\alpha}_{n-1} & \text{else} \end{cases}$$

wherein $\tilde{\alpha}_{n-1}$ designates a previous smoothened phase value;

$\alpha_n$ designates an input phase information;

"mod" designates a MODULO-operator; and $\delta$ designates a smoothing parameter, a value of which is in an interval between zero and one, excluding boundaries of the interval.

* * * * *